United States Patent [19]

Balmer

[11] Patent Number: 5,191,730
[45] Date of Patent: Mar. 9, 1993

[54] WING ATTACHMENT FOR BIRD DECOYS

[76] Inventor: Bruce Balmer, 75 Fremont St., P.O. Box 271, Douglas, Mich. 49406-0271

[21] Appl. No.: 591,949

[22] Filed: Oct. 2, 1990

[51] Int. Cl.$^5$ ............................................. A01M 31/06
[52] U.S. Cl. ................................................. 43/3; 43/2
[58] Field of Search ........................... 43/2, 3; 244/153; 40/418; 446/901, 490, 387, 388

[56] References Cited

U.S. PATENT DOCUMENTS

| | | | |
|---|---|---|---|
| 743,301 | 11/1903 | Lischtiak | 244/153 R |
| 1,603,114 | 10/1926 | Johnson | 43/3 |
| 2,663,108 | 12/1953 | Dixon et al. | 43/3 |
| 3,021,635 | 2/1962 | Sheridan | 43/3 |
| 3,435,550 | 4/1969 | Carlson | 43/3 |
| 4,228,977 | 10/1980 | Tanaka | 43/2 |
| 4,611,421 | 9/1986 | Jacob | 43/3 |

FOREIGN PATENT DOCUMENTS 2013508A 12/1977 United Kingdom .................. 446/99

Primary Examiner—Richard K. Seidel
Assistant Examiner—Jeanne M. Elpel
Attorney, Agent, or Firm—Waters & Morse

[57] ABSTRACT

Simulated wings of light and highly flexible material are attachable with Velcro strips to the body portion of a bird decoy along the top center line. The material is incapable of cantilever self-support. Preferably, an extension arm is positioned near the leading edges of the wing elements to make the material more accessible to air movement. The additional function of these is simply to hold the outer extremities of the wing elements out away from the body portion to prevent water adhesion.

4 Claims, 3 Drawing Sheets

WING ATTACHMENT FOR BIRD DECOYS

BACKGROUND OF THE INVENTION

Hunters of ducks and geese often use decoys to bring the birds within shooting range. It seems generally agreed that the more life-like the decoys are, the better. Some form of motion, such as body movement or wing-flapping, also appears to make the decoys more effective. Decoys with movable wings have been manually operated (by pull lines), motorized, or simply moved by wind action. Decoys simulating predatory birds can be used to repel birds normally preyed upon, and decoy motion is also effective in such cases.

Moving wing attachments to otherwise standard decoys have been of various designs. These range from wings taken from live birds (and secured to the decoys with rubber bands) to wings of flexible sheet material secured to the backs of the decoys along the center line. These have been used with both full-body and silhouette decoys. Occasionally, non-game birds are simulated by decoys to lend realism to the scene where the added birds are frequently seen in the company of the game birds.

SUMMARY OF THE INVENTION

Wing elements of a highly flexible material are secured to the back of the body of a bird decoy along the top center line. The material is incapable of cantilever self-support, and is light and also waterproof to prevent the absorption of water, and the consequent increase in weight. These wing elements are thus able to move under the influence of very little wind. The preferred form includes extension arms near the leading edges of the wings to hold the wing material out away from the body of the decoy to give the wind a better access to it. This arrangement also tends to prevent the wing material from being stuck to the body by the presence of water. The wing elements are made attachable to the standard decoys by the use of Velcro strips.

DESCRIPTION OF THE PREFERRED EMBODIMENTS

Figure 1:
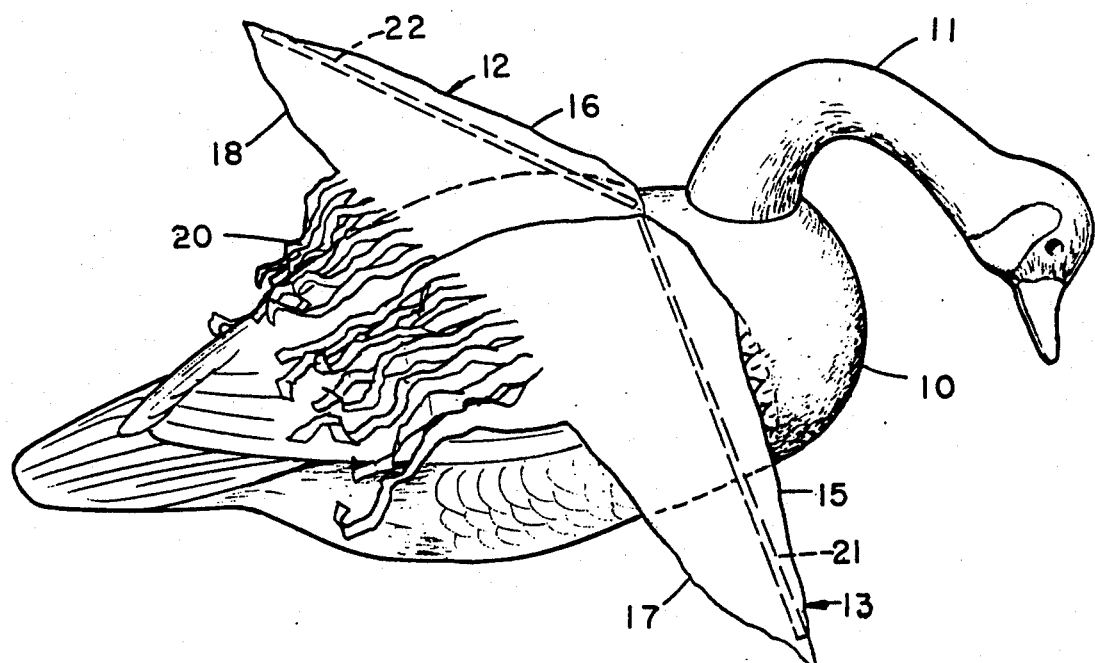
FIG. 1 is a perspective view of a standard full-body decoy, with a pair of separable wing elements secured along the back center line. Both of the wing elements have extension arms adjacent the leading edge.
Figure 5:
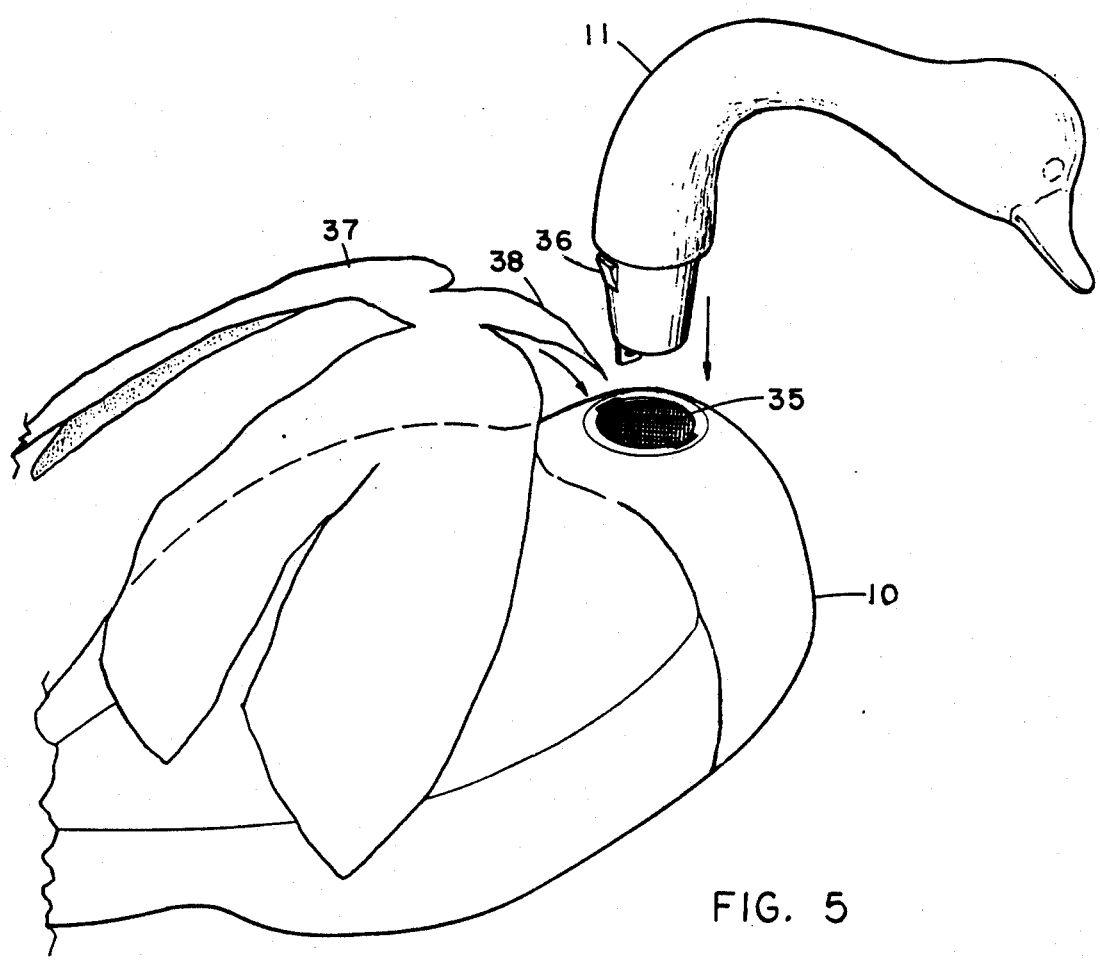
FIG. 5 is a perspective view of a full-body decoy with a removable neck-head section, and showing a wing element with a tab that can be tucked into the opening receiving the lower extremity of the neck for securing the wing element in position.

Referring to FIG. 1, the illustrated full-body decoy has a body portion 10 with a head-neck portion 11 that is removable as shown in FIG. 5. This is relatively standard construction. A form of twist lock is usually employed to secure these two components together. The wing elements 12 and 13 are secured to the back at the top center line, and meet along the line 14. Each of the wing elements has a leading edge as shown at 15 and 16, and a trailing edge 17–18. Approximately the inner third of the trailing edge is shredded as shown at 19 and 20 to provide strips that float easily with the slightest breeze, and produce the appearance of a bird fluffing up its feathers.

The preferred material for the wing elements is a thin plastic sheet of a type which does not absorb significant amounts of water. Polypropylene or polyethylene have been found suitable in thicknesses ranging from three to fifteen mils. It has been found that the use of embossed material not only produces an apparent texture similar to the feathers of a bird, but also tends to prevent the adhesion of the wing elements to the body portion of the bird in the presence of water. A material developed for a completely different purpose has been found surprisingly effective. This material has been developed for agricultural purposes, and is sometimes referred to as "weed-barrier film". The preferred coloring of this material will be determined largely by the type of decoy being used, which will have its characteristic coloring on the body portion.

Figure 2:
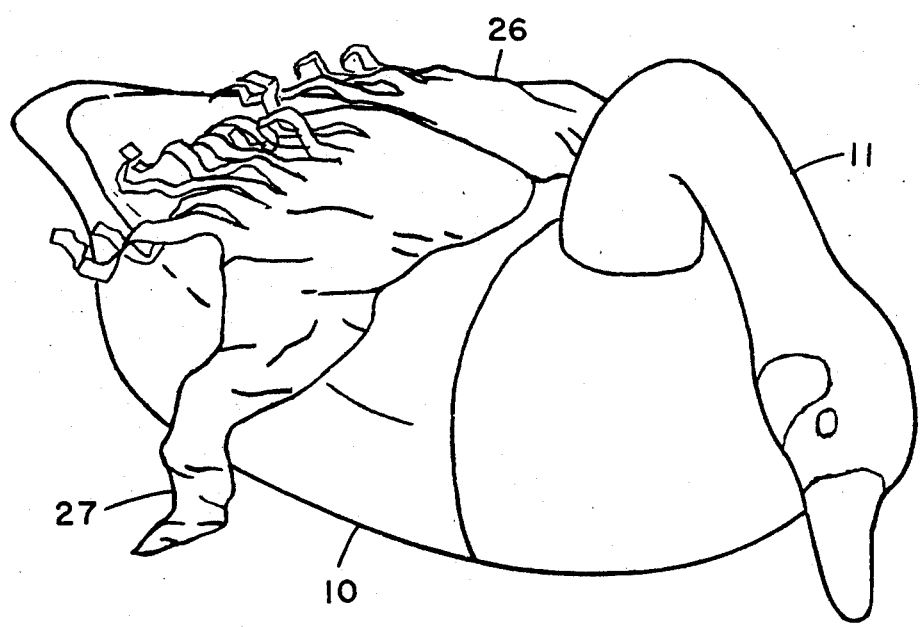
FIG. 2 is a perspective view of a full-body decoy showing a pair of wing elements without extension arms.
Figure 3:
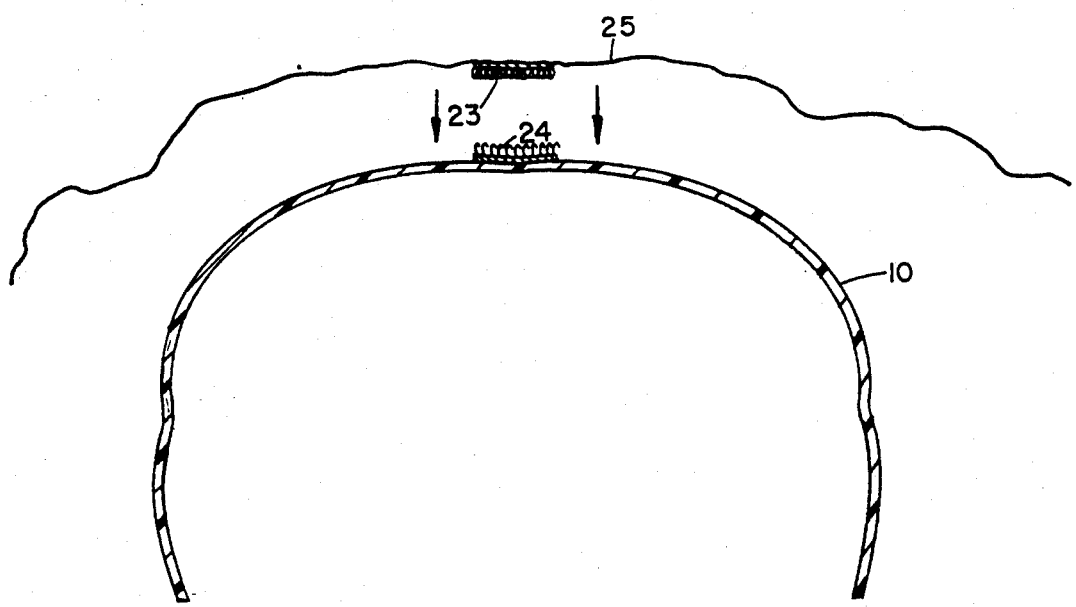
FIG. 3 is an exploded view showing the relative position in cross-section of the body portion of the decoy and the wing elements.
Figure 4:
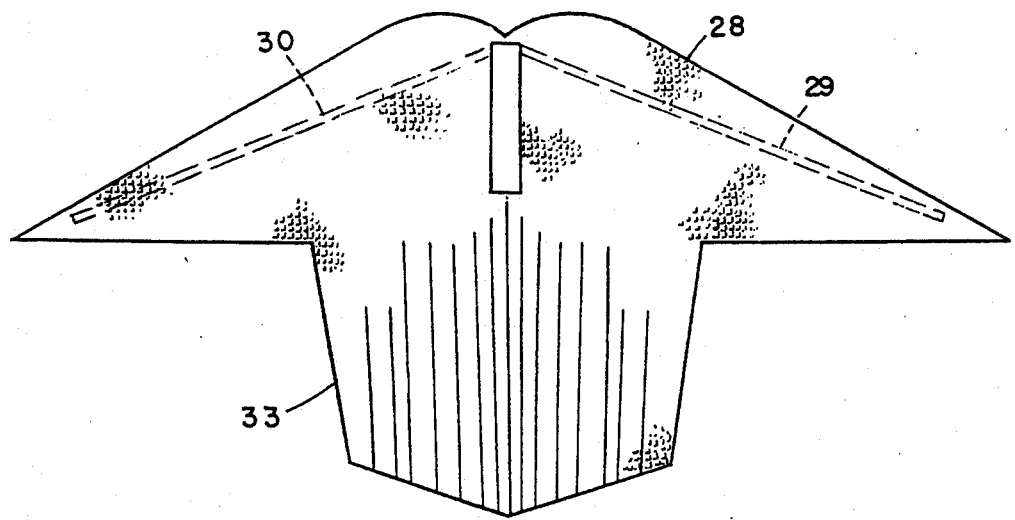
FIG. 4 is a view of the underside of a one-piece wing element extending over the full span.

FIG. 1 illustrates a form of the invention in which the wing elements are stiffened along the leading edge by the presence of extension rods 21 and 22, primarily to hold the wing elements out away from the body portion so that the wind can have a better access to it. The securing of the wing elements along the center line of the body portion permits the rods to bear along the sides of the body portion, as they are held down in the center. The preferred central attachment is through the use of mating Velcro strips 23 and 24, as shown in FIG. 3. In FIG. 3, the single wing element 25 is not provided with the extension rods, and is merely left to drape around the body portion 10 in a random fashion, as shown in FIG. 2. In FIG. 2, the loosely-drooping wing elements 26 and 27 are separable; but since they can be folded, they can as well be made in one piece, as shown in FIG. 3. The fringed trailing edges are preferably incorporated in all forms of the wing elements. In FIG. 4, the one-piece full-span wing element 28 is shown with the extension rods 29 and 30, and these may be discontinuous in the central portion adjacent the Velcro strip 31 to enable the entire unit to be folded along the center line. The shredded trailing edge portions 32 and 33 are as previously described.

Figure 6:
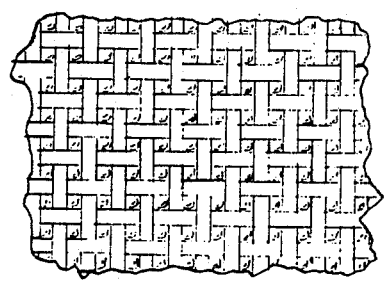
FIG. 6 is a fragmentary section of a recommended type of material for the wing elements, showing the embossed pattern.

Referring to FIG. 5, the head-neck section 11 of the decoy is shown provided with the section 34 adapted to enter the receptacle opening 35 in the body portion, and to be retained in assembled position by the twist lock 36 of standard design. The one piece wing element 37 (without extension rods) is provided with a short flap 38 adapted to be tucked into the opening 35 prior to the interengagement of the head-neck unit, as a means of retaining the wing element 37 in place. This may be supplemented by the additional use of the Velcro strips along the back center line. FIG. 6 illustrates a recommended embossing pattern for the sheet material of the wing elements.

I claim:

1. In combination with a bird decoy, said decoy having a body portion and a head-neck portion, a wing attachment comprising:

at least one sheet of unreinforced material having a wing configuration having a leading and a trailing edge, said material having a degree of flexiblity such that it is incapable of cantilever self-support, at least a major portion of said sheet normally drooping down about said body portion in the absence of wind action; and fastening means disposed along said body portion adjacent the top center line thereof, and adapted to secure said sheet of material thereto.

2. An attachment as defined in claim 1, wherein said material is embossed.

3. An attachment as defined in claim 1, wherein said sheet has a fringed trailing edge in the central portion thereof.

4. An attachment as defined in claim 1, wherein said body portion has a receptacle normally receiving said neck portion, and said sheet has a portion normally engaging said neck portion receptacle.

* * * * *